United States Patent Office 2,737,534
Patented Mar. 6, 1956

2,737,534

PRODUCTION OF AROMATIC HYDROCARBONS FROM SIX CARBON ALIPHATIC DIOLS

Arthur William Charles Taylor, David Gwyn Jones, and Morag Lauchlan Noble, Norton-on-Tees, England, assignors to Imperial Chemical Industries Limited, a corporation of Great Britain No Drawing. Application December 27, 1951, Serial No. 263,683

Claims priority, application Great Britain January 17, 1951

4 Claims. (Cl. 260—668)

This invention relates to the production of aromatic hydrocarbons.

According to the present invention, there is provided a process for the production of aromatic hydrocarbons, which comprises the step of contacting a diol having a chain of at least six carbon atoms at a temperature within the range of 300° to 750° C. and in the vapour phase with a catalyst as hereinafter defined.

Diols suitable for use in the process of the present invention include, for example, hexane-diols and hexene-diols, which give rise to benzene on treatment according to the process. Similarly hexane-diols and hexene-diols containing a methyl substituent in the carbon chain give rise to toluene. However, the most important embodiment of the invention resides in the production of aromatic hydrocarbons from diols having a structure:

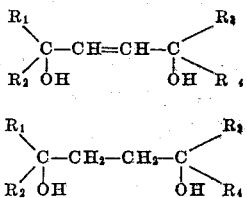

or mixtures thereof, in which $R_1$, $R_2$, $R_3$ and $R_4$ are selected from hydrogen, methyl, ethyl, n-propyl and isopropyl, the said diols having at least eight carbon atoms. Thus, a xylene hydrocarbon fraction rich in para-xylene may be produced from 2,5-dimethylhex-3 ene-2,5-diol, and/or 2,5-dimethylhexane-2,5-diol.

Catalysts suitable for use in the process of the present invention are those normally employed in aromatisation reactions. Those comprising metals of group VIII of the periodic system, and the oxides of chromium, molybdenum and vanadium are particularly suitable. The latter may conveniently be employed in conjunction with other metallic oxides, such as alumina and magnesia. It is particularly preferred to employ a supported platinum catalyst, such as platinum on charcoal, or a chromic oxide-alumina catalyst.

A chromic oxide-alumina catalyst may be produced by dehydrating alumina trihydrate, $Al_2O_3.3H_2O$, at a temperature of 400° C. until the product contains from 9 to 11% by weight of water. The product is pelleted using a suitable pelleting lubricant, subsequently heated if necessary at a temperature of 700° C. to remove this lubricant if its presence is undesirable, and the pellets are then soaked in a solution of chromic acid until they acquire the desired chromium content. They are then dried at an elevated temperature of, for example, 400° C. The chromium oxides content of the final catalyst is preferably 10 to 15% by weight. It is also advantageous to incorporate a minor amount of magnesium chromate into the catalyst; a suitable amount is 2% by weight, expressed as the percentage by weight of MgO in the final catalyst.

The conversion of the diol to aromatic hydrocarbons is preferably carried out as a continuous process. The temperature at which the conversion is carried out should be within the range of 300° to 750° C., but the optimum temperature depends upon the diol to be converted and the catalyst employed. Thus, when using a chromic oxide-alumina catalyst, a suitable temperature is one lying within the range of 500° to 550° C.

The process of the present invention may be carried out by passing the diol to a vaporiser prior to introducing it into the converter. The dial may be introduced inot the vaporiser in the solid or liquid form, or, alternatively, it may be introduced into the reactor or vaporiser in the form of a solution, in, for example, water or methanol.

The process may be carried out in the presence of a carrier gas such as hydrogen or nitrogen which may be mixed with the vaporised diol, and the mixture passed through the catalyst bed maintained at the desired temperature.

The diol for use in the process of the present invention may be produced by any convenient process. For example, when 2,5-dimethylhex-2,5 ene-2,5-diol is employed, this may be produced by condensing acetone with acetylene in the presence of potassium hydroxide, or a potassium alkoxide, and subsequently subjecting the 2,5-dimethylhex-3 yne-2,5-diol produced to partial hydrogenation.

Suitable catalysts for this partial hydrogenation are, for example, finely divided palladium, platinum which has been partially poisoned with, for example, carbon monoxide, disodium phosphate, boric acid or piperidine, nickel-containing catalysts, for example Raney nickel produced by the partial or complete extraction of an alkali-soluble metal from an alloy of this with nickel, and iron catalysts produced by the extraction with aqueous caustic alkali of the aluminium from a finely divided iron-aluminium alloy containing, for example, 50% by weight of iron. The hydrogenation may be carried out by dissolving the acetylenic diol in a suitable solvent, for example, methanol, ethanol or ethyl acetate, and contacting this solution with hydrogen, in the presence of the selected catalyst. This hydrogenation may be carried out at room temperature and atmospheric or superatmospheric pressure.

If 2,5-dimethylhexane-2,5-diol is to be employed as the starting material, this may be produced by the hydrogenation of 2,5-dimethylhex-3 yne-2,5-diol, prepared as hereinbefore described, using a hydrogenation catalyst. For example, platinum, nickel and copper catalysts may be employed. The platinum may be used in a finely-divided form, for example, as platinum black, or it may be supported on an inert carrier, for example, kieselguhr.

The nickel and copper catalysts for the hydrogenation may be supported on porous, inert materials, but it is also possible to use Raney-type catalysts, which have been prepared, for example, by the substantially complete extraction of aluminium from a nickel-aluminium or copper-aluminium alloy by means of a solution of alkali. Foraminate catalysts are also suitable for use in the process. These may be prepared by the partial extraction with alkali of aluminium or silicon from an alloy containing one of these elements and nickel or copper. Suitable alloys are copper-aluminium alloys, containing 40 to 80% by weight of copper, nickel-aluminium alloys containing 30 to 65% by weight of nickel; copper-silicon alloys containing 80 to 92% by weight of copper.

The optimum conditions for the hydrogenation depend upon the catalyst employed. With a platinum catalyst, the process may be carried out at atmospheric pressure and temperature, but when using Raney nickel, it is preferred to operate at elevated temperature and pressure.

It is an important feature of the present invention that a mixture of 2,5-dimethylhex-3 ene-2,5-diol and 2,5-dimethylhexane-2,5-diol may be employed in the aromatisation reaction. Thus, the product obtained by hydrogenating 2,5-dimethylhex-3 yne-2,5-diol, such that between 1 and 2 moles of hydrogen are absorbed per mole of yne-diol may be passed to the aromatisation step without separating the saturated and unsaturated diols from each other.

It should also be noted that when 2,5-dimethylhex-3 ene-2,5-diol is converted to xylenes by the process of the present invention, 2,5-dimethylhexane-2,5-diol may be produced in the conversion zone as an intermediate product, particularly when added hydrogen is also present. Thus, the present invention is intended to cover the mode of operation in which, in the same conversion zone, 2,5-dimethylhex-3 ene-2,5-diol is initially converted wholly or partially to 2,5-dimethylhexane-2,5-diol, and this mixture is then aromatised to xylene hydrocarbons, and, in particular, to para-xylene.

In the process of the present invention, aliphatic hydrocarbons are produced as by-products. Thus, when the starting material is 2,5-dimethylhex-3 ene-2,5-diol and/or 2,5-dimethylhexane-2,5-diol, aliphatic hydrocarbons such as dimethallyl, 1,1,4,4-tetramethylbutadiene, and dimethylhexenes may be produced as by-products. These are preferably recycled to the conversion zone together with a further charge of diol.

*Example 1*

231 grams of 2,5-dimethylhex-3-yne-2,5-diol were dissolved in methanol. 50 grams of a Raney nickel catalyst were added, and the hydrogenation of the diol carried out at 50° C. and 250 atmospheres pressure. When hydrogen absorption had ceased, the product was filtered, and the methanol removed. The product, 2,5-dimethylhexane-2,5-diol was a white crystalline solid, melting at 84° C. The product weighed 197.3 grams, corresponding to a yield of 83%.

100 grams of 2,5-dimethylhexane-2,5-diol were dissolved in 250 mls. of methanol. The solution was passed at a rate of 62 mls./hour over 250 mls. of a chromic oxide on alumina catalyst containing on analysis 13% by weight of oxides of chromium, 2% by weight of magnesia (present as magnesium chromate) and 85% by weight of activated alumina. Hydrogen was also passed over the catalyst at a rate of 5 litres/hour. This catalyst was maintained at a temperature of 500° C.

The reaction product contained 43.7 grams of liquid, of which 9.5 grams were water, and 34.2 grams were a water-insoluble product. Since in a control experiment it had been established that under these conditions methanol itself gives rise to no liquid products, the 34.2 grams of water-insoluble product were derived from the diol. On distillation, the water-insoluble product gave fractions, which on infra-red analysis showed that the following compounds had been formed:

| | Grams |
|---|---|
| 2,5-dimethylhexane | 11.5 |
| Dimethallyl | 1.2 |
| 1,1,4,4-tetramethylbutadiene | 2.7 |
| m-Xylene | 0.1 |
| p-Xylene | 14.9 |
| Toluene | 0.1 |
| Dimethylhexanes | 3.6 |

Hence 15.1 grams of aromatic hydrocarbon were identified, and of this amount, 98.4% by weight was p-xylene. This corresponds to a pass yield of p-xylene of 20.5%.

Furthermore, 15.5 grams of dimethylhexane, dimethallyl and tetramethylbutadiene were obtained, as shown in the table above, and these compounds may be readily aromatised in high yield to paraxylene.

*Example 2*

45 grams of 2,5-dimethylhex-3 ene-2,5-diol, made up to a total volume of 90 mls. with methanol, were passed at a rate of 1 litre of solution per litre of catalyst-filled space per hour over 100 mls. of the chromic oxide-alumina catalyst, described in Example 1. Hydrogen was passed through the converter at a rate of 6 litres/hour, and the catalyst was maintained at 550° C.

From the product, 21.4 grams of organic compounds were isolated. On distillation and infra-red analysis, this was found to contain 11.8 grams of para-xylene, which corresponds to a yield of 36%.

We claim:
1. A process for the production of hydrocarbon mixtures containing p-xylene which comprises the step of contacting at least one dihydric alcohol selected from the group consisting of 2,5-dimethylhex-3 ene-2,5-diol and 2,5-dimethylhexane-2,5-diol in the presence of hydrogen at a temperature within the range of 300° to 750° C. in the vapor phase with a catalyst consisting essentially of chromic oxide and alumina.

2. A process as recited in claim 1 in which the chromium oxides content of the said catalyst is from 10 to 15% by weight.

3. A process as recited in claim 1 in which a temperature within the range of 500 to 550° C. is employed.

4. A process as recited in claim 1 in which said catalyst contains a minor amount of magnesium chromate.

References Cited in the file of this patent

UNITED STATES PATENTS

| | | |
|---|---|---|
| 1,094,223 | Kyriakides | Apr. 21, 1914 |
| 2,157,365 | Vaughn | May 9, 1939 |
| 2,250,445 | Bruson et al. | July 29, 1941 |
| 2,302,345 | Pesta et al. | Nov. 17, 1942 |
| 2,419,030 | Otto | Apr. 15, 1947 |
| 2,569,441 | Alquist et al. | Oct. 2, 1951 |

OTHER REFERENCES

Komarewsky et al.: Jour. Amer. Chem. Soc., vol. 61 (1939), pages 2525–2527 (3 pages).

Johnson et al.: Industrial and Eng. Chem., vol. 38, pages 990–996 (October 1946; 7 pages).

Plate et al.: "Chem. Abstracts," vol. 42 (1948), col. 7234c, abstract from "Doklady Akad Nauk," USSR, vol. 59 (1948), pages 1305–8.